(12) United States Patent
Saiki (10) Patent No.: US 9,552,538 B2
(45) Date of Patent: Jan. 24, 2017

(54) IMAGE FORMING APPARATUS THAT DISPLAYS A REMAINING AMOUNT OF RECORDING MATERIAL, AND CONTROL METHOD FOR DISPLAYING A REMAINING AMOUNT OF RECORDING MATERIAL IN AN IMAGE FORMING APPARATUS

(71) Applicant: CANON KABUSHIKI KAISHA, Tokyo (JP)

(72) Inventor: Kenji Saiki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/470,146

(22) Filed: Aug. 27, 2014

(65) Prior Publication Data

US 2015/0062634 A1 Mar. 5, 2015

(30) Foreign Application Priority Data

Aug. 30, 2013 (JP) .................................. 2013-179998

(51) Int. Cl.
| | | |
|---|---|---|
| *G06K 15/00* | (2006.01) | |
| *G06K 15/02* | (2006.01) | |
| *G03G 15/00* | (2006.01) | |

(52) U.S. Cl.
CPC ......... *G06K 15/4075* (2013.01); *G03G 15/502* (2013.01); *G03G 15/553* (2013.01); *G06K 15/1823* (2013.01)

(58) Field of Classification Search
None
See application file for complete search history.

(56) References Cited

U.S. PATENT DOCUMENTS

| | | | |
|---|---|---|---|
| 2002/0054340 A1* | 5/2002 | Tokutomi | B41J 2/17533 358/1.15 |
| 2003/0012576 A1* | 1/2003 | Owen et al. | 399/27 |
| 2006/0280513 A1* | 12/2006 | Hatakeyama | G03G 15/553 399/27 |
| 2008/0131146 A1 | 6/2008 | Kendall | |
| 2011/0076036 A1 | 3/2011 | Hiraike | |
| 2011/0262154 A1* | 10/2011 | Ajima | G03G 15/553 399/27 |
| 2013/0136459 A1* | 5/2013 | Hirama | 399/10 |

FOREIGN PATENT DOCUMENTS

| | | |
|---|---|---|
| CN | 1790182 A | 6/2006 |
| JP | 2006-343621 A | 12/2006 |

* cited by examiner

*Primary Examiner* — Andrew H Lam
(74) *Attorney, Agent, or Firm* — Canon U.S.A., Inc. IP Division (57) ABSTRACT

An image forming apparatus for performing image formation using a recording material includes an acquisition unit configured to acquire a remaining amount of the recording material, a prediction unit configured to predict a remaining amount of the recording material based on data used for the image formation, a setting unit configured to set the predicated remaining amount of the recording material as a remaining amount of the recording material to be displayed, and a control unit configured to perform control so that when the predicted remaining amount of the recording material reaches a remaining amount of the recording material to be acquired next by the acquisition unit, the remaining amount of the recording material to be displayed is maintained at the remaining amount of the recording material to be acquired next by the acquisition unit until the acquisition unit acquires the next remaining amount of the recording material.

6 Claims, 9 Drawing Sheets

IMAGE FORMING APPARATUS THAT DISPLAYS A REMAINING AMOUNT OF RECORDING MATERIAL, AND CONTROL METHOD FOR DISPLAYING A REMAINING AMOUNT OF RECORDING MATERIAL IN AN IMAGE FORMING APPARATUS

BACKGROUND OF THE INVENTION

Field of the Invention

The present invention relates to an image forming apparatus and a control method.

Description of the Related Art

An image forming apparatus forms an image on a sheet by using a recording material such as toner. Generally, the recording material is contained in a container such as a cartridge. A certain type of image forming apparatus detects the amount of the recording material remaining in the container, and displays its value on a display unit such as a user interface (UI).

Conventionally, the image forming apparatus includes a sensor and displays a value detected by the sensor directly on the display unit as the remaining amount of the recording material. In many cases, in view of the costs or the like, the image forming apparatus employs a sensor unable to exhibit a high detection accuracy until the remaining amount is reduced to a certain level. In such a case, the sensor discretely detects the remaining amount of the recording material, for example, as 100%, 20%, and 0%. As a result, the display unit similarly displays the remaining amount of the recording material discretely, for example, as 100%, 20%, and 0%.

On the other hand, Japanese Patent Application Laid-Open No. 2006-343621 discusses a technique for continuously displaying the remaining amount of the recording material on the display unit while employing a sensor configured to discretely detect the remaining amount. For example, when image formation is performed, the predicted value of the remaining toner amount is calculated based on the dot count value of raster data, and the predicted value is displayed as the current value of the remaining toner amount. Then, after the sensor value of the remaining toner amount has been acquired from the sensor, the current value is updated based on the sensor value.

However, an error occurs in the predicted value of the remaining toner amount due to various factors (e.g., dot density). Thus, the current value may gradually deviate from the actual remaining toner amount.

SUMMARY OF THE INVENTION

The present invention is directed to preventing the current value of a remaining toner amount from gradually deviating from the actual remaining toner amount even when an error occurs in the predicted value of the remaining toner amount.

According to an aspect of the present invention, an image forming apparatus for performing image formation using a recording material includes an acquisition unit configured to acquire a remaining amount of the recording material, a prediction unit configured to predict a remaining amount of the recording material based on data used for the image formation, a setting unit configured to set the remaining amount of the recording material predicted by the prediction unit as a remaining amount of the recording material to be displayed, and a control unit configured to perform control in such a manner that when the remaining amount of the recording material predicted by the prediction unit has reached a remaining amount of the recording material to be acquired next by the acquisition unit, the remaining amount of the recording material to be displayed is maintained at the remaining amount of the recording material to be acquired next by the acquisition unit until the acquisition unit acquires the next remaining amount of the recording material.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

Figure 1:
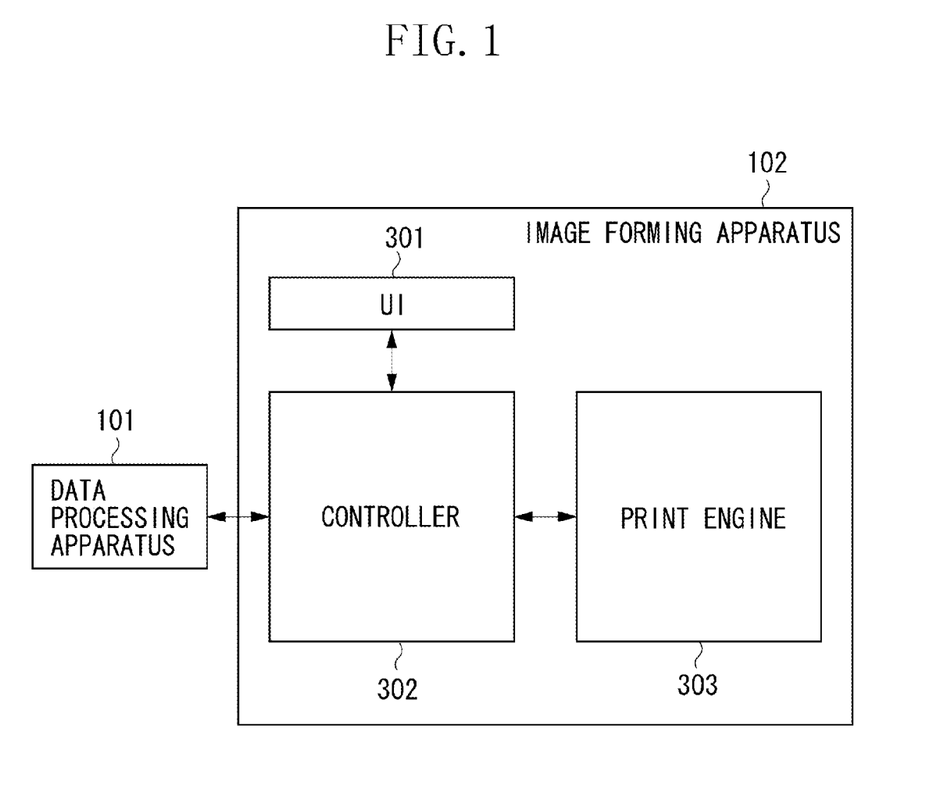
FIG. 1 is a block diagram illustrating a configuration of an image forming apparatus.

FIG. 1 is a block diagram illustrating a configuration of an image forming apparatus according to a first exemplary embodiment.

A data processing apparatus 101 (e.g., personal computer (PC)) generates image data and transmits the data to an image forming apparatus 102.

The image forming apparatus 102 (e.g., laser printer) receives the image data from the data processing apparatus 101 to perform image formation on a sheet based on the image data. The image forming apparatus 102 may be a multifunction peripheral including a scanner, a facsimile, and other functions.

A UI 301 includes a display unit that transmits various pieces of information to a user and an operation unit that receives various operations from the user. The current value of the remaining toner amount to be described below is displayed on the display unit. The current value of the remaining toner amount may be transmitted to an external apparatus such as the data processing apparatus 101 via an external interface (I/F) and displayed on a display unit included in the external apparatus such as the data processing apparatus 101.

A controller 302 generates bitmap data based on page-description language (PDL) data, and transmits the bitmap data to a print engine 303. The controller 302 will be described in detail below with reference to FIG. 2.

The print engine 303 performs image formation on a sheet by an electrophotographic method using toner based on the bitmap data received from the controller 302. An image forming method may be, for example, an ink jet method other than the electrophotographic method. The recording material is toner in the case of the electrophotographic method, while the recording material is ink in the case of the ink jet method.

The controller 302 and the print engine 303, which are separately provided, may be integrated.

Figure 2:
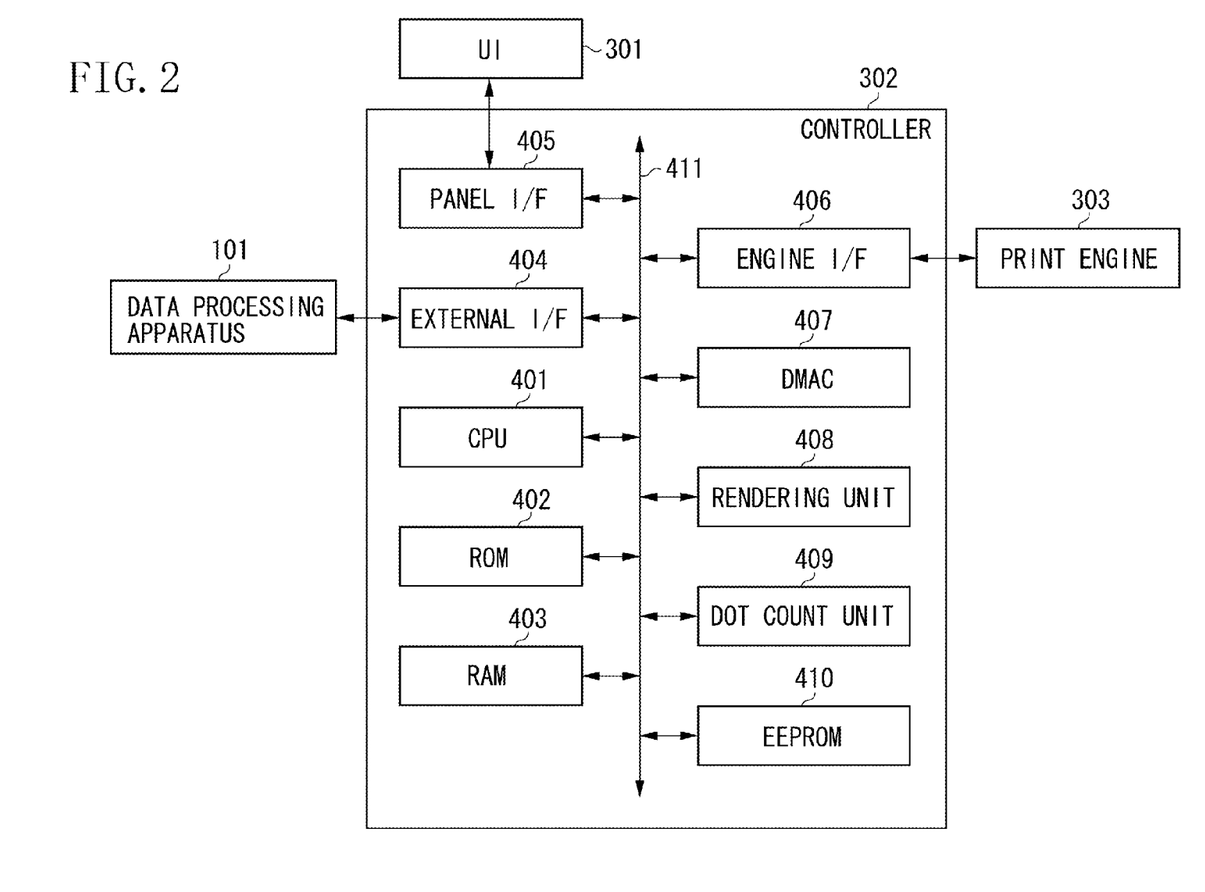
FIG. 2 is a block diagram illustrating a configuration of a controller.

FIG. 2 is a block diagram illustrating a configuration of the controller 302.

A central processing unit (CPU) 401 loads a program stored in a read-only memory (ROM) 402 into a random access memory (RAM) 403, and executes the program to control the image forming apparatus 102. Further, as described below, the CPU 401 calculates the remaining toner amount based on the predicted value of a consumed toner amount obtained by converting the number of dots counted by a dot count unit 409, or on the sensor value of the remaining toner amount provided from the print engine 303. Then, the CPU 401 displays the calculated remaining toner amount on the UI 301 via a panel I/F 405 or notifies the data processing apparatus 101 of the amount via the external I/F 404.

The ROM 402 stores the program or the like to be executed by the CPU 401.

The RAM 403 stores the program or the like that is loaded from the ROM 402 thereinto. The RAM 403 stores PDL data, intermediate data generated by interpreting the PDL data, bitmap data generated by rendering the intermediate data, and other various pieces of temporary information such as processing status or log information necessary for processing.

The external I/F 404 interconnects the data processing apparatus 101 and the controller 302 to relay data communication therebetween, namely, data transmission or reception.

The panel I/F 405 interconnects the UI 301 and the controller 302 to relay data communication therebetween, namely, data transmission or reception.

An engine I/F 406 interconnects the print engine 303 and the controller 302 to relay data communication therebetween, namely, data transmission or reception.

A direct memory access controller (DMAC) 407 receives a command from the CPU 401 to perform data access to the RAM 403, namely, data writing/reading to/from the RAM 403.

A rendering unit 408 rasterizes the intermediate data to generate bitmap data.

The dot count unit 409 counts, among the dots included in the generated bitmap data, the number of dots for consuming toner during image formation. Specifically, the number of dots of colors other than white is counted. For example, in the case of monochromatic printing, the number of dots corresponding to black (K) is counted. In the case of color printing, the number of dots corresponding to any of yellow (Y), magenta (M), cyan (C), and black (K) is counted. Counting the number of dots may be carried out by the CPU 401 or the rendering unit 408.

An electrically erasable programmable read-only memory (EEPROM) 410 stores setting information or the like of the image forming apparatus 102.

A bus 411 interconnects the components in the controller 302.

Figure 3:
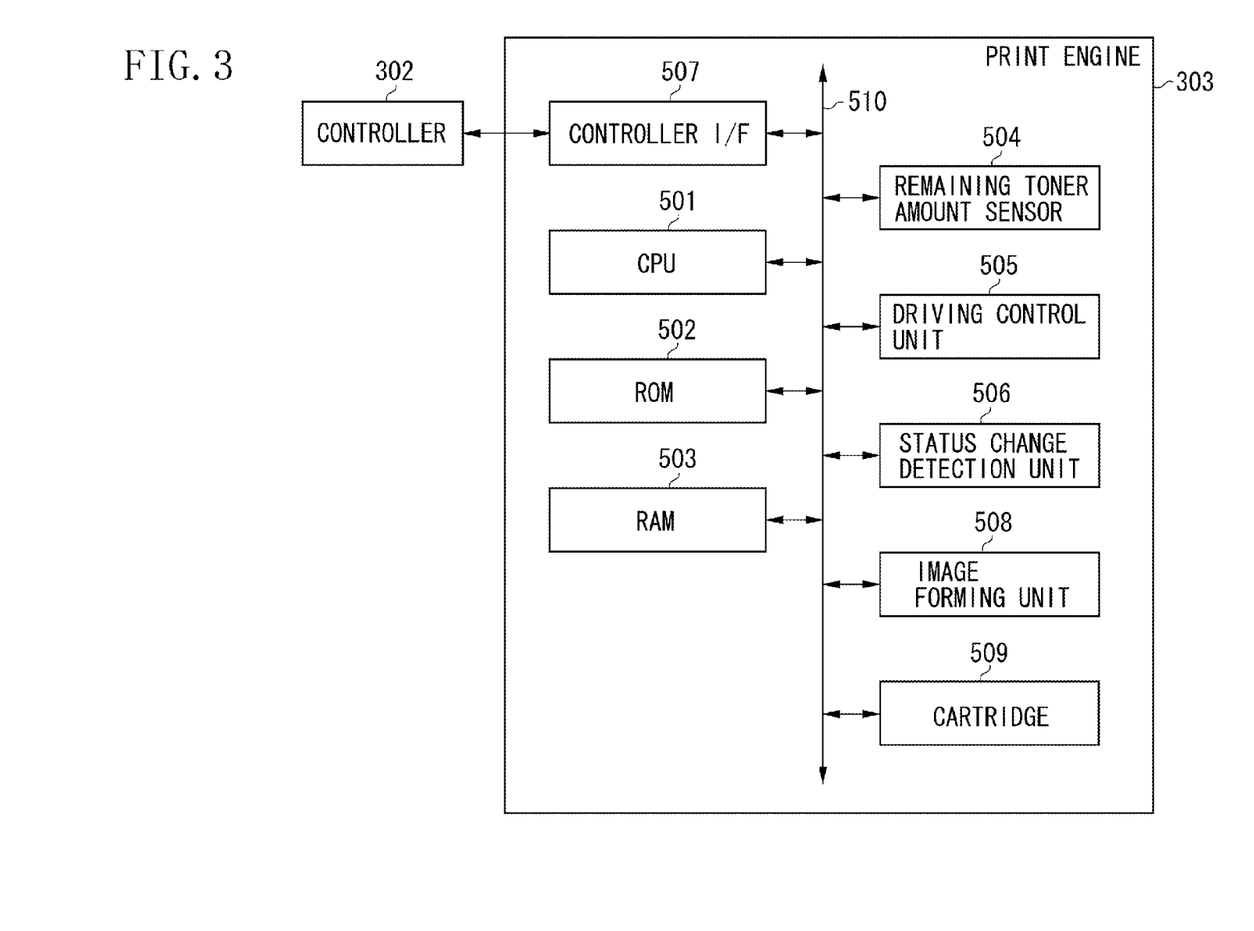
FIG. 3 is a block diagram illustrating a configuration of a print engine.

FIG. 3 is a block diagram illustrating a configuration of the print engine 303.

A CPU 501 loads a program stored in a ROM 502 into a RAM 503, and executes the program to control the print engine 303.

The ROM 502 stores the program to be executed by the CPU 501.

The RAM 503 stores the program or the like loaded from the ROM 502 thereinto.

A remaining toner amount sensor 504 measures the remaining toner amount contained in a cartridge 509. As a remaining toner amount detection method in a sensor, for example, there are a magnetic permeability detection method, a magnet method, a piezoelectric vibration method, and a transmitted light method. For example, when the remaining toner amount reaches a predetermined value such as 20% or 0%, the sensor detects its value as a sensor value. More specifically, when the remaining toner amount is from 100% to 21%, the sensor detects it as 100%, when the remaining toner amount is from 20% to 1%, the sensor detects it as 20%, and when the remaining toner amount is 0%, the sensor detects it as 0%. The sensor may be included in the cartridge 509.

A driving control unit 505 drives various motors necessary when an image forming unit 508 performs image formation.

A status change detection unit 506 detects a status change such as jamming or cover opening in the image forming apparatus 102. The status change detection unit 506 also detects replacement of the cartridge 509. Detection of the status change may be performed by the CPU 501.

A controller I/F 507 interconnects the controller 302 and the print engine 303 to relay data communication therebetween, namely, data transmission or reception.

The image forming unit 508 performs image formation on a sheet by an electrophotographic method using toner based on the bitmap data received from the controller 302.

The cartridge 509 is a process cartridge which can be installed into the image forming apparatus 102 as a container for containing toner, and contains the toner to be used when the image forming unit 508 performs image formation. The cartridge 509 includes a nonvolatile storage medium for storing cartridge information. The cartridge information includes, for example, information indicating whether the cartridge 509 is new, color information indicating a color of the cartridge 509, and remaining toner amount information indicating the current remaining toner amount in the cartridge 509. The cartridge 509, which is connected to a bus 510, may be connected to the CPU 501 via a dedicated line.

The bus 510 interconnects the components in the print engine 303.

Figure 4:
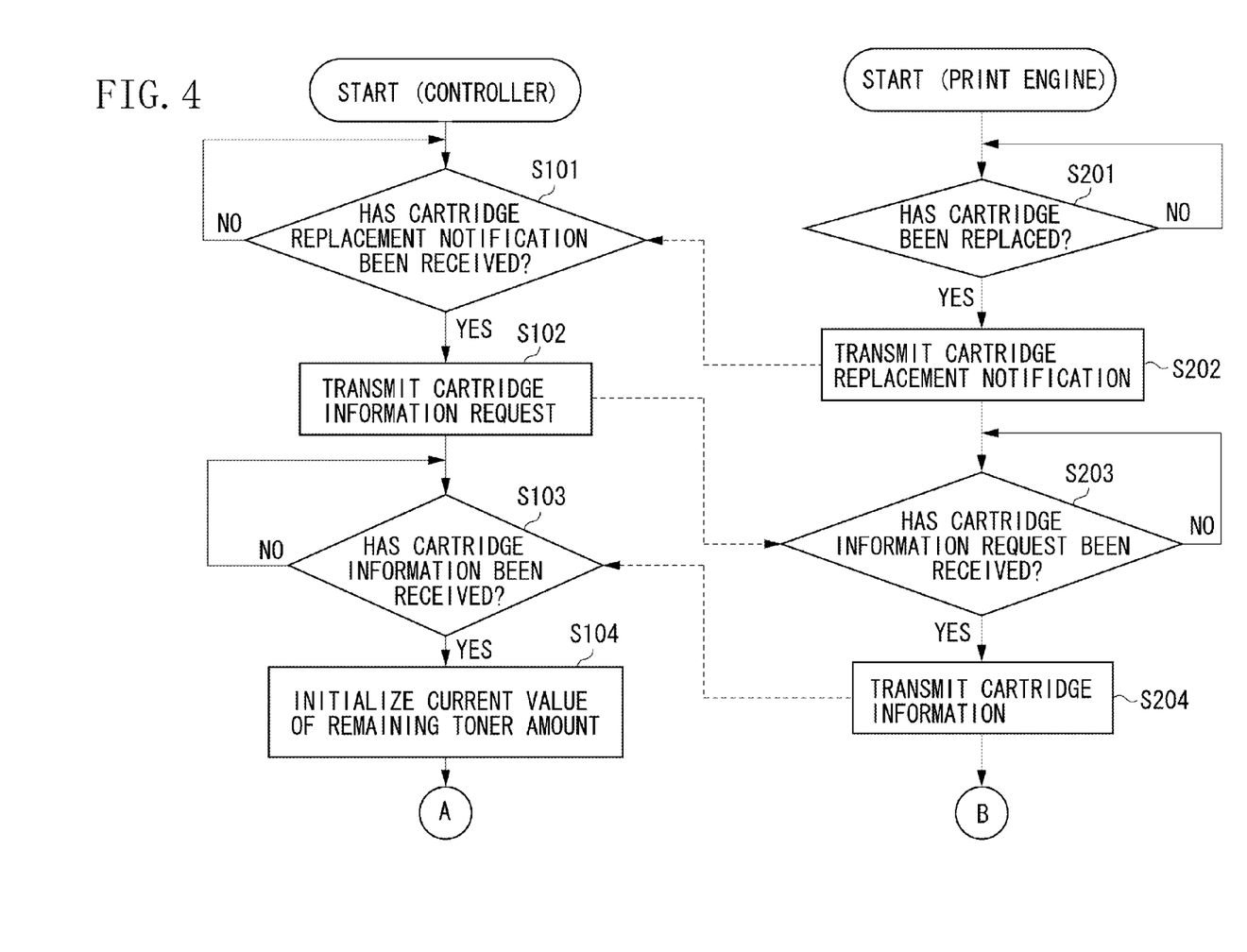
FIG. 4 is a flowchart (first half) illustrating control of remaining toner amount detection.
Figure 5A:
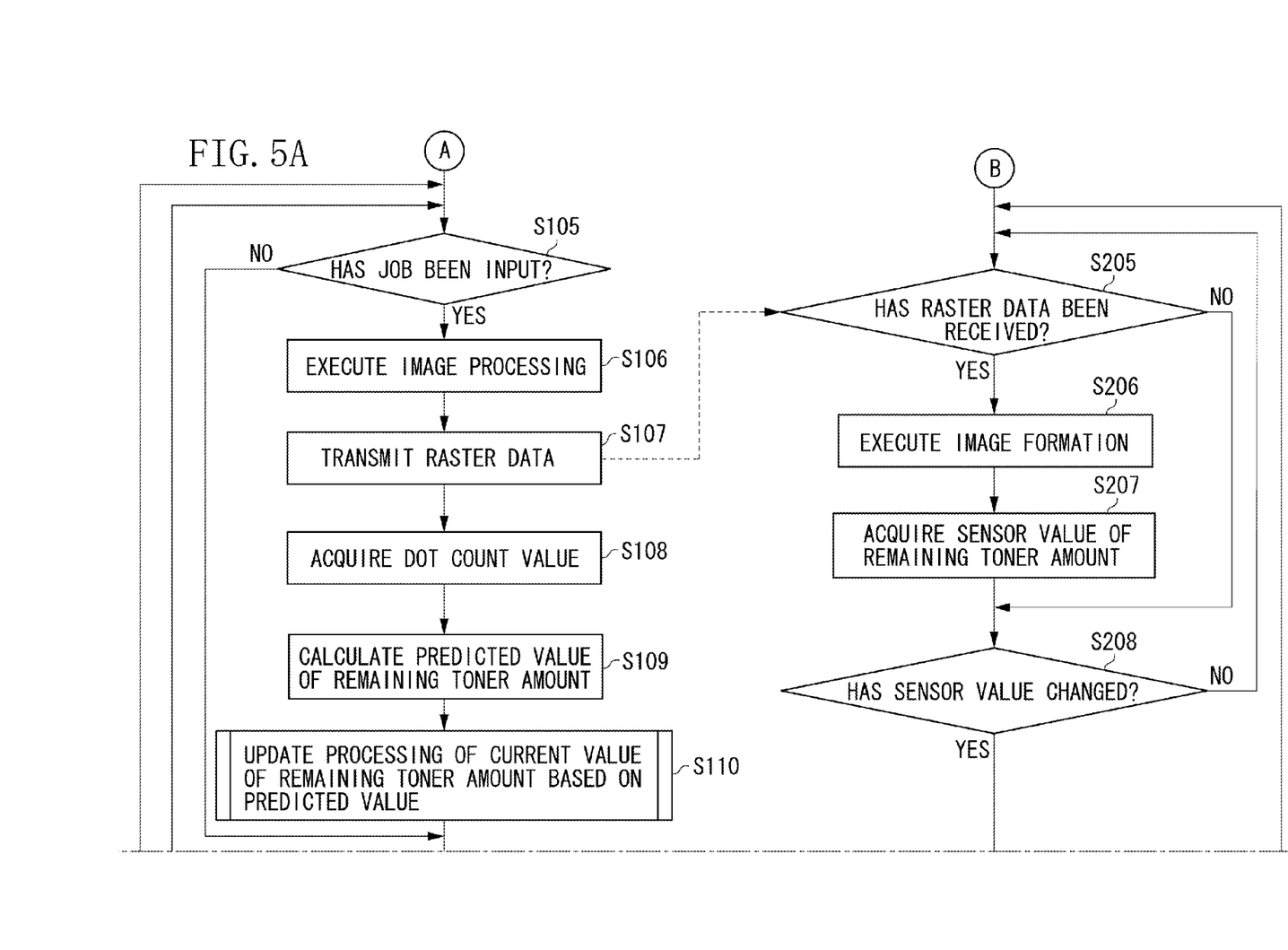
FIGS. 5A and 5B are flowcharts (second half) illustrating the control of the remaining toner amount detection.
Figure 5B:
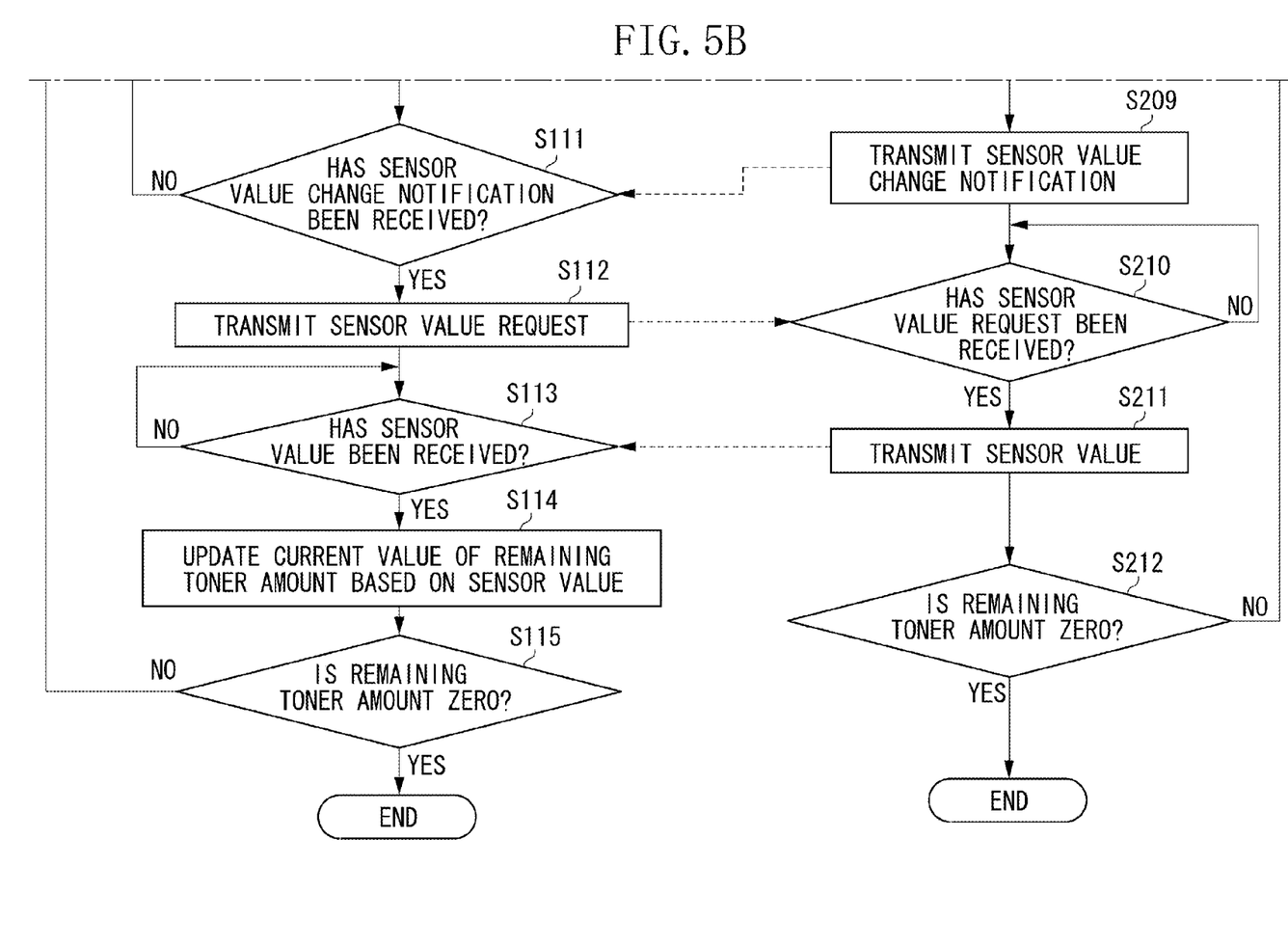

FIGS. 4, 5A, and 5B are flowcharts illustrating control of remaining toner amount detection.

The control illustrated in the flowchart on the left side of FIGS. 4 and 5 is achieved in such a manner that in the controller 302, the CPU 401 loads a control program stored in the ROM 402 into the RAM 403 and executes the program. The control illustrated in the flowchart on the right side of FIGS. 4 and 5 is achieved in such a manner that in the print engine 303, the CPU 501 loads a control program stored in the ROM 502 into the RAM 503 and executes the program.

First, in step S201, the CPU 501 determines whether the cartridge 509 has been replaced. Specifically, the replacement is determined by detecting the installation of a new cartridge 509 into the image forming apparatus 102. The installation of the cartridge 509 is recognized in such a manner that the status change detection unit 506 detects the installation of the cartridge 509 and notifies the CPU 501 of the installation. The installation of the cartridge 509 may be detected by the opening or closing of a cover provided to replace the cartridge 509 or by a button or a switch that causes the on/off state to change hardware-wise according to attaching or detaching of a component. The processing proceeds to step S202 when the CPU 501 determines that the cartridge 509 has been replaced (YES in step S201). The processing stands by when the CPU 501 determines that the cartridge 509 has not been replaced (NO in step S201).

Then, in step S202, the CPU 501 transmits a cartridge replacement notification indicating the replacement of the cartridge 509 to the controller 302 via the controller I/F 507.

In step S101, the CPU 401 determines whether the cartridge replacement notification has been received from the print engine 303 via the engine I/F 406. The processing proceeds to step S102 when the CPU 401 determines that the cartridge replacement notification has been received (YES in step S101). The processing stands by when the CPU 401 determines that the cartridge replacement notification has not been received (NO in step S101).

In step S102, the CPU 401 transmits a cartridge information request for requesting cartridge information of the cartridge 509 to the print engine 303 via the engine I/F 406.

In step S203, the CPU 501 determines whether the cartridge information request has been received from the controller 302 via the controller I/F 507. The processing proceeds to step S204 when the CPU 501 determines that the cartridge information request has been received (YES in step S203). The processing stands by when the CPU 501 determines that the cartridge information request has not been received (NO in step S203).

In step S204, the CPU 501 transmits the cartridge information of the cartridge 509 to the controller 302 via the controller I/F 507.

In step S103, the CPU 401 determines whether the cartridge information has been received from the print engine 303 via the engine I/F 406. The processing proceeds to step S104 when the CPU 401 determines that the cartridge information has been received (YES in step S103). The processing stands by when the CPU 401 determines that the cartridge information has not been received (NO in step S103).

In step S104, the CPU 401 initializes the current value of the remaining toner amount based on the cartridge information. The current value of the remaining toner amount is a value recognized by the controller 302 as the remaining toner amount in the cartridge 509, and displayed to the user via the UI 301. In initialization of the current value of the remaining toner amount, specifically, when the cartridge 509 is determined to be new by referring to the cartridge information, the current value of the remaining toner amount is set to 100%. When it is unclear as to whether the cartridge 509 is new, the current value of the remaining toner amount is set to a value corresponding to the remaining toner amount information included in the above-mentioned cartridge information. The current value of the remaining toner amount is stored in the RAM 403 or the like.

In step S105, the CPU 401 determines whether a job requiring execution of image formation has been input from the data processing apparatus 101 via the external I/F 404. Examples of the job include a PDL print job, a copy job, and a facsimile reception print job. The processing proceeds to step S106 when the CPU 401 determines that the job has been input (YES in step S105). The processing proceeds to step S111 when the CPU 401 determines that the job has not been input (NO in step S105).

In step S106, the CPU 401 executes image processing necessary for image formation based on the job. The image processing includes processing for controlling the rendering unit 408 to rasterize print data to generate raster data.

In step S107, the CPU 401 transmits the raster data generated by the image processing to the print engine 303 via the engine I/F 406.

In step S108, the CPU 401 acquires a dot count value measured when the raster data is generated. The dot count value may be acquired on a page-by-page basis or on a job-by-job basis.

In step S109, the CPU 401 calculates the predicted value of the remaining toner amount based on the dot count value acquired in step S108. Specifically, the CPU 401 first performs the following calculation: (the dot count value [dots] in execution of printing for the target job or page)× (the amount of toner to be consumed for each dot [g/dot]) =(the amount of toner to be consumed by executing the target job [g]). Information about the amount of toner to be consumed for each dot may be stored beforehand in the ROM 402 or included in the cartridge information received in step S103. Next, the CPU 401 performs the following calculation: (the current remaining toner amount [g])−(the amount of toner to be consumed by executing the target job [g])=(the latest remaining toner amount [g]). Then, the CPU 401 performs the following calculation (the latest remaining toner amount [g])/(the remaining toner amount [g] in the unused state of the cartridge=(the predicted value [%] of the latest remaining toner amount). Information about the remaining toner amount in the unused state of the cartridge may be stored beforehand in the ROM 402 or included in the cartridge information received in step S103.

In step S110, the CPU 401 executes processing for updating the current value of the remaining toner amount based on the predicted value calculated in step S109. This processing will be described in detail below with reference to FIG. 6.

In step S205, the CPU 501 determines whether the raster data has been received from the controller 302 via the controller I/F 507. The processing proceeds to step S206 when the CPU 501 determines that the raster data has been received (YES in step S205). The processing proceeds to step S208 when the CPU 501 determines that the raster data has not been received (NO in step S205).

In step S206, the CPU 501 controls the image forming unit 508 to execute image formation based on the raster data.

In step S207, the CPU 501 acquires the sensor value of the remaining toner amount from the remaining toner amount sensor 504. The timing of acquiring the sensor value may be the timing of completing the image formation on a page-by-page basis or the timing of completing the image formation on a job-by job basis. The timing of acquiring the sensor value may be each time a predetermined time has elapsed.

In step S208, the CPU 501 determines whether the sensor value acquired this time has changed from that acquired last time. The processing proceeds to step S209 when the CPU 501 determines that the sensor value has changed (YES in step S208). The processing returns to step S205 when the CPU 501 determines that the sensor value has not changed (NO in step S208).

In step S209, the CPU 501 transmits a sensor value change notification indicating the change of the sensor value to the controller 302 via the controller I/F 507.

In step S111, the CPU 401 determines whether the sensor value change notification has been received from the print engine 303 via the engine I/F 406. The processing proceeds to step S112 when the CPU 401 determines that the sensor value change notification has been received (YES in step S111). The processing returns to step S105 when the CPU 401 determines that the sensor value change notification has not been received (NO in step S111).

In step S112, the CPU 401 transmits a sensor value request requesting a sensor value to the print engine 303 via the engine I/F 406.

In step S210, the CPU 501 determines whether the sensor value request has been received from the controller 302 via the controller I/F 507. The processing proceeds to step S211 when the CPU 501 determines that the sensor value request has been received (YES in step S210). The processing stands by when the CPU 501 determines that the sensor value request has not been received (NO in step S210).

In step S211, the CPU 501 transmits the sensor value to the controller 302 via the controller I/F 507.

In step S113, the CPU 401 determines whether the sensor value has been received from the print engine 303 via the engine I/F 406. The processing proceeds to step S114 when the CPU 401 determines that the sensor value has been received (YES in step S113). The processing stands by when the CPU 401 determines that the sensor value has not been received (NO in step S113).

In step S114, the CPU 401 updates the current value of the remaining toner amount based on the sensor value received in step S113. The sensor value acquired this time is stored in the RAM 403 or the like. If the sensor value acquired last time is stored therein, it is updated to the sensor value acquired this time.

In step S115, the CPU 401 refers to the current value of the remaining toner amount to determine whether the remaining toner amount is zero. The processing ends when the CPU 401 determines that the remaining toner amount is zero (YES in step S115). The processing returns to step S105 when the CPU 401 determines that the remaining toner amount is not zero (NO in step S115).

In step S212, the CPU 501 refers to the sensor value of the remaining toner amount to determine whether the remaining toner amount is zero. The processing ends when the CPU 501 determines that the remaining toner amount is zero (YES in step S212). The processing returns to step S205 when the CPU 501 determines that the remaining toner amount is not zero (NO in step S212).

Figure 6:
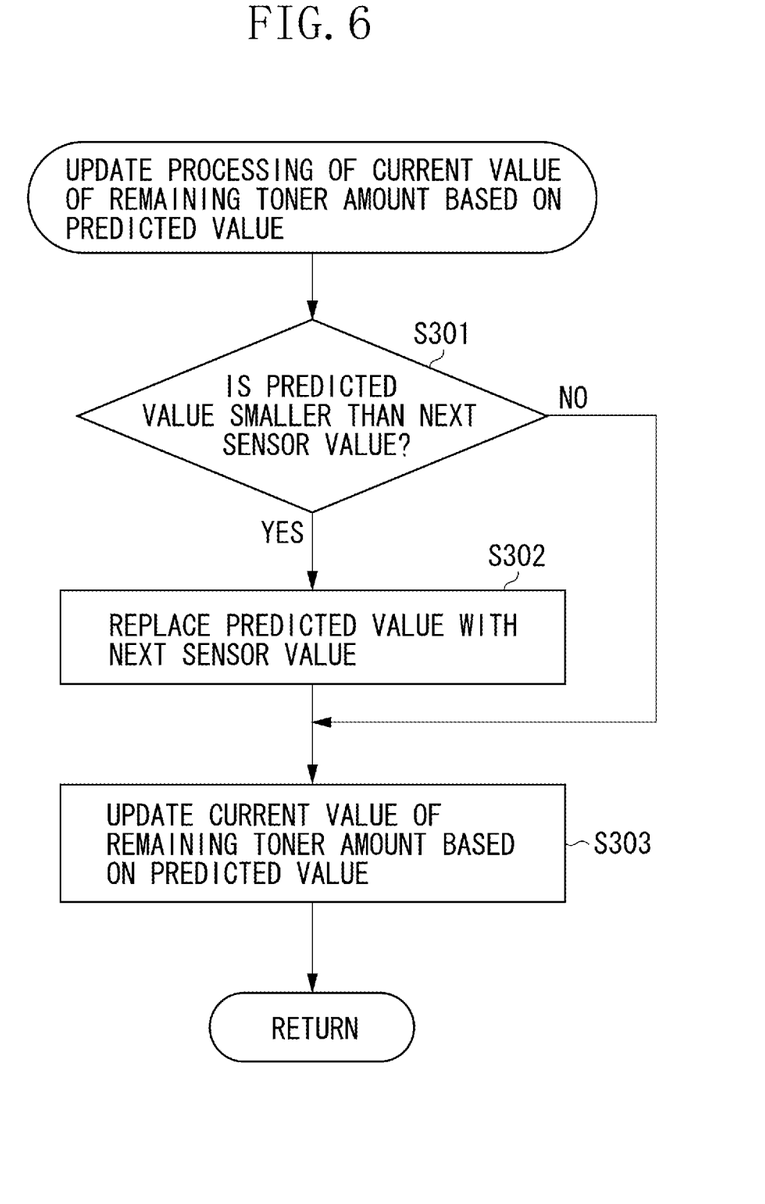
FIG. 6 is a flowchart illustrating, in detail, update processing of a remaining toner amount based on a predicted value.

FIG. 6 is a flowchart illustrating, in detail, processing for updating the remaining toner amount based on the predicted value.

First, in step S301, the CPU 401 determines whether the predicted value of the remaining toner amount calculated in step S109 is smaller than the next sensor value. The next sensor value is the sensor value to be received in step S113 next time the remaining toner amount sensor 504 detects a change in the sensor value in step S208. Specifically, for example, if the sensor value is detectable at each of points 100%, 40% and 0% as the accuracy of the remaining toner amount sensor 504, when the last acquired sensor value is 100%, the next sensor value is 40%. The processing proceeds to step S302 when the CPU 401 determines that the predicted value of the remaining toner amount is smaller than the next sensor value (YES in step S301). The processing proceeds to step S303 when the CPU 401 determines that the predicted value of the remaining toner amount is not smaller than the next sensor value (NO in step S301).

In step S302, the CPU 401 replaces the predicted value of the remaining toner amount calculated in step S109 with the next sensor value.

In step S303, the CPU 401 updates the current value of the remaining toner amount to the predicted value of the remaining toner amount. Specifically, when the CPU 401 determines that the predicted value of the remaining toner amount is smaller than the next sensor value (YES in step S301), the current value of the remaining toner amount is updated to the next sensor value that has replaced the predicted value in step S302. When the CPU 401 determines that the predicted value of the remaining toner amount is not smaller than the next sensor value (NO in step S301), the current value of the remaining toner amount is updated to the predicted value of the remaining toner amount calculated in step S109.

Figure 7:
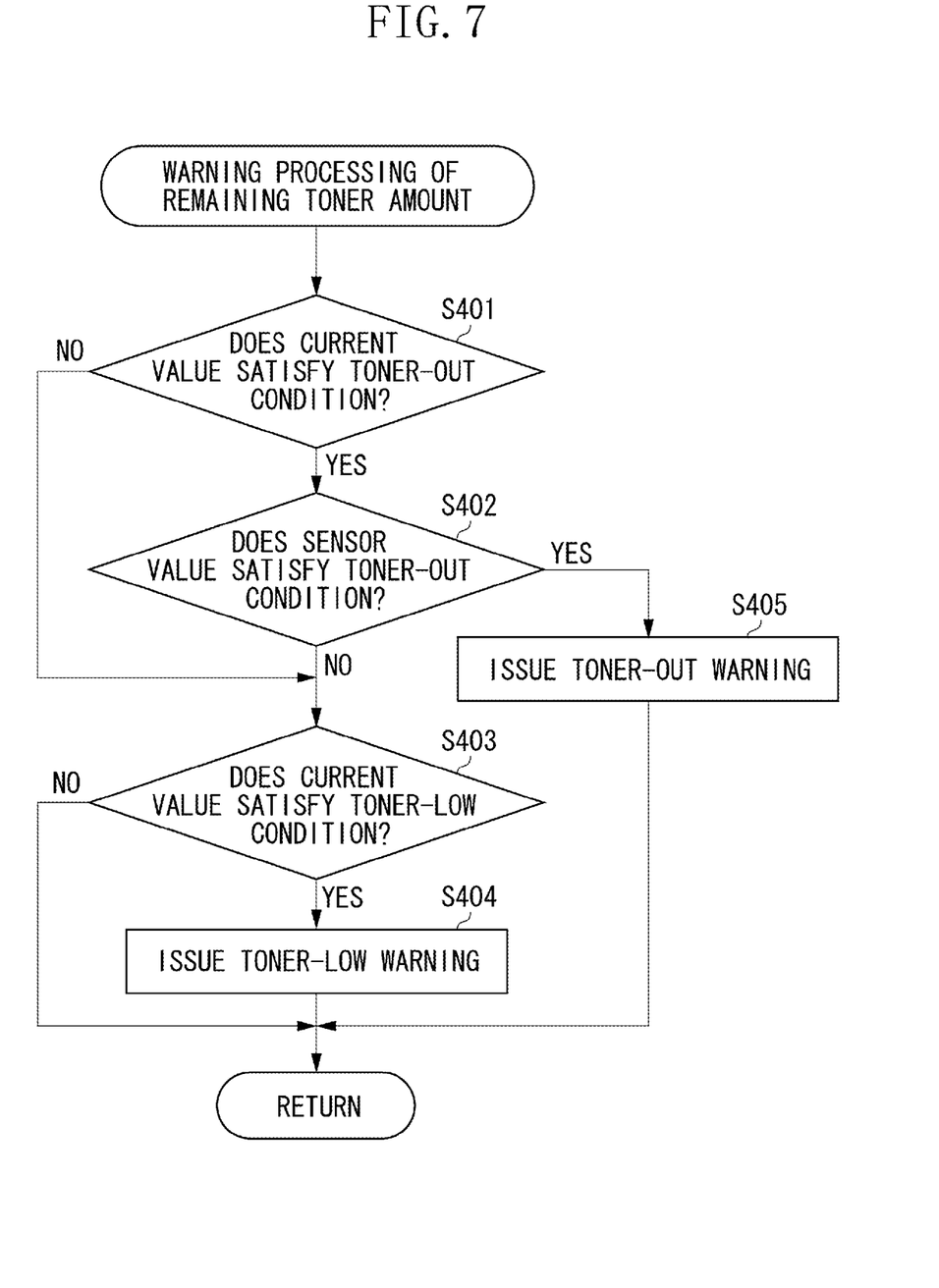
FIG. 7 is a flowchart illustrating warning processing of the remaining toner amount.

FIG. 7 is a flowchart illustrating processing for warning the remaining toner amount.

The control illustrated in the flowchart is achieved in such a manner that the CPU 401 loads a control program stored in the ROM 402 into the RAM 403 to execute the program.

The control illustrated in the flowchart is executed independently of and in parallel to the control described above referring to FIGS. 4, 5A and 5B. The timing of executing the control may be each time a predetermined time elapses, each time the predetermined number of jobs is executed, or each time the predetermined number of pages is printed.

First, in step S401, the CPU 401 determines whether the current value stored in the RAM 403 satisfies the toner-out condition. The toner-out condition is that the remaining toner amount has reached a value such as 0% at which a printing operation is considered to be unable to continue. The processing proceeds to step S402 when the CPU 401 determines that the current value stored in the RAM 403 satisfies the toner-out condition (YES in step S401). The processing proceeds to step S403 when the CPU 401 determines that the current value stored in the RAM 403 does not satisfy the toner-out condition (NO in step S401).

In step S402, the CPU 401 determines whether the sensor value stored in the RAM 403 satisfies the toner-out condition. The processing proceeds to step S405 when the CPU 401 determines that the sensor value stored in the RAM 403 satisfies the toner-out condition (YES in step S402). The processing proceeds to step S403 when the CPU 401 determines that the sensor value stored in the RAM 403 does not satisfy the toner-out condition (NO in step S402).

In step S403, the CPU 401 determines whether the current value stored in the RAM 403 satisfies the toner-low condition. The toner-low condition is that the toner remaining amount has reached a value such as 40% at which the printing operation is considered to be unable to continue soon. The processing proceeds to step S404 when the CPU 401 determines that the current value stored in the RAM 403 satisfies the toner-low condition (YES in step S403). The processing ends when the CPU 401 determines that the current value stored in the RAM 403 does not satisfy the toner-low condition (NO in step S403).

In step S404, the CPU 401 performs toner-low warning processing. The toner-low warning processing is to display, on the UI 301, information indicating a small remaining toner amount or information prompting the user to prepare a cartridge, and transmit the information to the data processing apparatus 101 without temporarily stopping the image forming operation. An order for a new cartridge may be automatically placed during the toner-low warning processing.

In step S405, the CPU 401 performs toner-out warning processing. The toner-out warning processing is to display, on the UI 301, information indicating running-out of toner or information prompting the user to replace the cartridge, and transmit the information to the data processing apparatus 101 by temporarily stopping the image forming operation.

Figure 8:
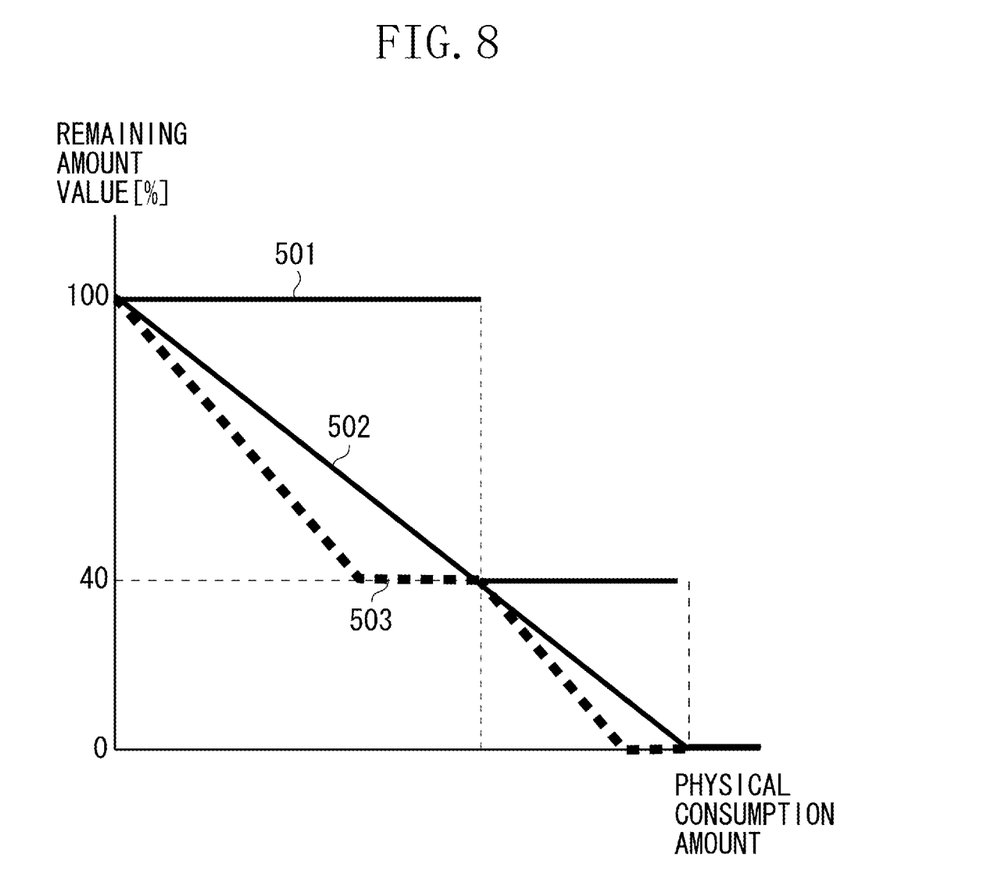
FIG. 8 is a diagram illustrating a change in a current value of the remaining toner amount.

FIG. 8 is a diagram illustrating a change in the current value of the remaining toner amount.

A sensor value 501 is a value that can be acquired from a sensor. In the present exemplary embodiment, the values 100%, 40%, and 0% can be acquired as sensor values.

A change 502 in the actual remaining toner amount is the accurate value of the amount of toner actually remaining. It is very difficult to directly acquire the actual remaining toner amount, for example, unless the sensor is highly accurate across the entire range.

A change 503 in the current value is also illustrated in FIG. 8.

According to the present exemplary embodiment, as illustrated in FIG. 6, when the current value has reached 40% before the sensor value 40% is detected, then in step S302, the current value is maintained at 40% until the sensor value 40% is detected. Accordingly, at the sensor value 40%, deviation between the current value and the sensor value is corrected.

According to the present exemplary embodiment, as illustrated in FIG. 7, even if the current value has reached 0% (YES in step S401), when the sensor value has not reached 0% (No in step S402), the toner-out warning processing is unnecessary.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-179998 filed Aug. 30, 2013, which is hereby incorporated by reference herein in its entirety.

What is claimed is:

1. An image forming apparatus for performing image formation using a recording material, the image forming apparatus comprising:
   one or more processors; and
   memory storing computer executable instructions that, when executed by the one or more processors, cause the one or more processors to:
   acquire a first remaining amount of the recording material—which is specified by a remaining-amount sensor;
   calculate a consumed amount of the recording material based on a dot count, and calculate a second remaining amount of the recording material based on the calculated consumed amount; and
   display, on a displaying unit, a remaining amount of the recording material based on the calculated second remaining amount,
   wherein the displaying unit displays information for prompting a user to change a cartridge which contains the recording material in a case where the acquired first remaining amount is equal to or less than a predetermined remaining amount indicating the run-out of the recording material, and
   wherein the displaying unit does not display the information for prompting a user to change the cartridge, even if the second remaining amount calculated based on the dot count is equal to or is less than the predetermined remaining amount, until the acquired first remaining amount specified by the remaining-amount sensor becomes equal to or less than the predetermined remaining amount.

2. The image forming apparatus according to claim 1, wherein the recording material is toner.

3. The image forming apparatus according to claim 1, wherein whether or not the displaying unit displays the information for prompting a user to change the cartridge is determined based on a relative relation between the calculated second remaining amount calculated based on the dot count and the acquired first remaining amount specified by the remaining-amount sensor.

4. The image forming apparatus according to claim 1, wherein in a case where the calculated second remaining amount calculated based on the dot count is smaller than the acquired first remaining amount specified by the remaining-amount sensor, the displaying unit does not display the information for prompting a user to change the cartridge.

5. A method for controlling an image forming apparatus performing image formation using a recording material, the method comprising:
   acquiring a first remaining amount of the recording material which is specified by a remaining-amount sensor;
   calculating a consumed amount of the recording material based on a dot count, and calculating a second remaining amount of the recording material based on the calculated consumed amount; and
   displaying, on a displaying unit, a remaining amount of the recording material based on the calculated second remaining amount,
   wherein the displaying unit displays information for prompting a user to change a cartridge which contains the recording material in a case where the acquired first remaining amount is equal to or less than a predetermined remaining amount indicating the run-out of the recording material, and
   wherein the displaying unit does not display the information for prompting a user to change the cartridge, even if the second remaining amount calculated based on the dot count is equal to or is less than the predetermined remaining amount, until the acquired first remaining amount specified by the remaining-amount sensor becomes equal to or less than the predetermined remaining amount.

6. A non-transitory computer-readable storage medium storing instructions that when executed cause a computer to execute a process for controlling an image forming apparatus for performing image formation using a recording material, the process comprising:
   acquiring a first remaining amount of the recording material which is specified by a remaining-amount sensor;
   calculating a consumed amount of the recording material based on a dot count, and calculating a second remaining amount of the recording material based on the calculated consumed amount; and displaying, on a displaying unit, a remaining amount of the recording material based on the calculated second remaining amount, wherein the displaying unit displays information for prompting a user to change a cartridge which contains the recording material in a case where the acquired first remaining amount is equal to or less than a predetermined remaining amount indicating the run-out of the recording material, and wherein the display unit does not display the information for prompting a user to change the cartridge, even if the second remaining amount calculated based on the dot count is equal to or is less than the predetermined remaining amount, until the acquired first remaining amount specified by the remaining-amount sensor becomes equal to or less than the predetermined remaining amount.

* * * * *